United States Patent Office 2,826,071
Patented Mar. 11, 1958

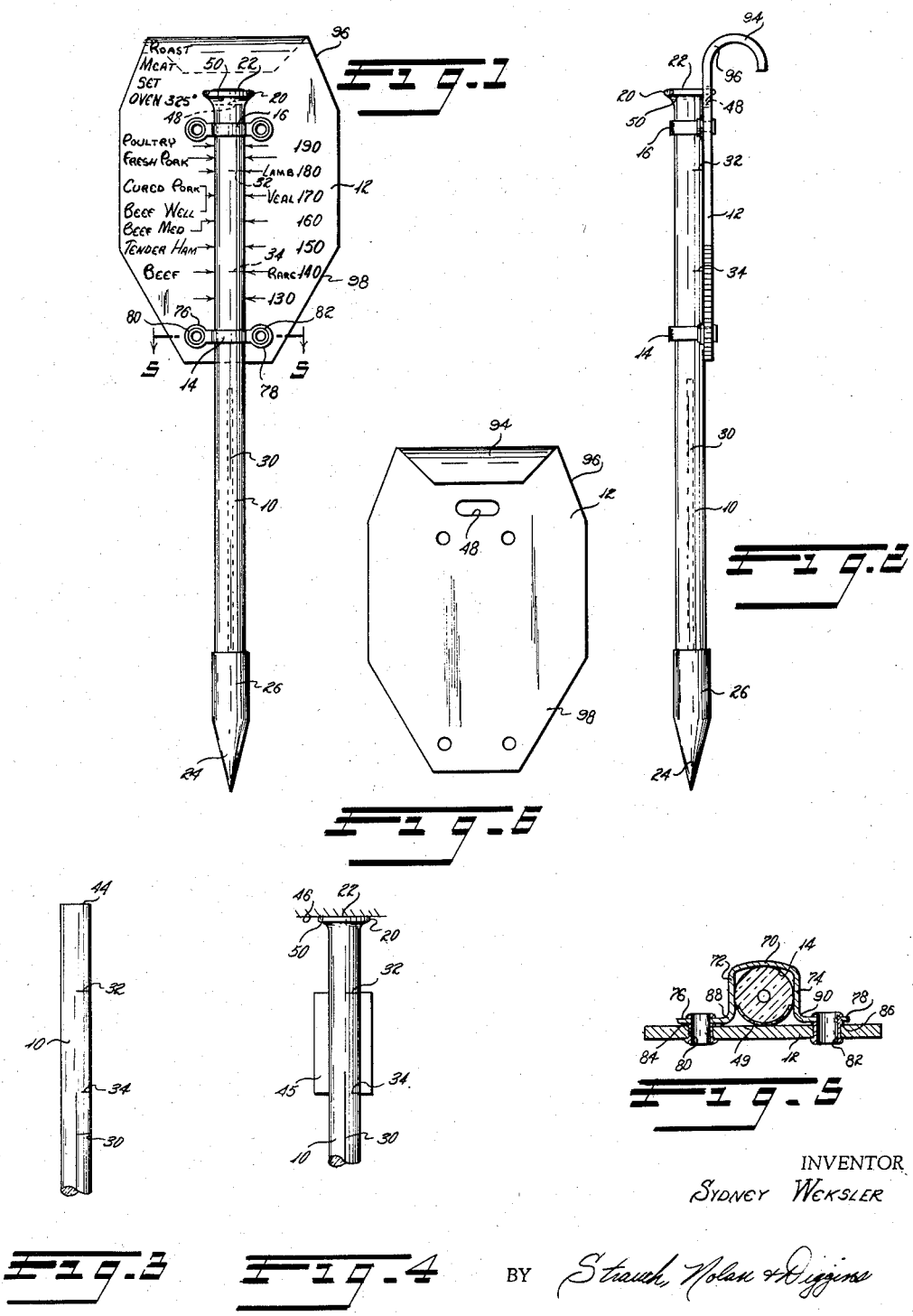

2,826,071

THERMOMETER

Sydney Weksler, Springfield, Ohio, assignor to Thermometer Corporation of America, Springfield, Ohio, a corporation Application December 14, 1954, Serial No. 475,187

9 Claims. (Cl. 73—352)

This invention relates to improvements in thermometer constructions which facilitate calibration and positioning of the thermometer tube on a scale plate and more particularly to meat thermometers and to methods for calibrating and assembling such thermometers. While the advantages of the invention are best realized in meat thermometers it is to be understood that the invention is in certain aspects of general application in the thermometer art.

In assembling a thermometer to a scale plate it is necessary to locate the calibrated scale accurately with respect to the height of the fluid column in the thermometer tube in the desired temperature range. There are two basic methods of securing the thermometer tube to the scale plate that have beeen previously used. One comprises forming the positioning structure on the thermometer tube as part of the tube closing operation before calibration of the tube, then calibrating the thermometer tube and subsequently matching the calibrated tube to the scale plate with either the positioning structure or the calibrations on the scale plate being later applied to match the scale plate to the thermometer tube. The other prior basic method utilizes a scale plate having its positioning structure and scale graduations preformed on the scale plate and the thermometer tube formed initially without a positioning structure, then calibrating the thermometer tube and finally a positioning structure is subsequently added to the thermometer tube as by fusing a knob on or sawing a notch in the thermometer tube to accurately position the thermometer tube on the scale plate.

According to my invention the height of the fluid column is observed before the tube is permanently sealed and the tube marked at a predetermined calibrating temperature after which the upper tube end is cut off a predetermined distance from the calibrating mark, is heated to softening temperature and formed into a projecting positioning surface forming the permanent seal for the thermometer tube bore. The projecting surface extends into and engages a locating slot or recess in the scale plate for accurately positioning the thermometer tube on the scale plate. Both the positioning projection and slot can be easily and inexpensively formed and together provide positive positioning of the thermometer tube which is frictionally mounted in novel manner on the scale plate without reducing the strength of the thermometer tube. When used as a meat thermometer a novelly shaped scale plate having an attractive and convenient hand gripping extension is used to assist in the insertion and extraction of the thermometer and the tube projection and slot co-operate to limit relative movement of the frictionally mounted scale during insertion and removal of the tube into the meat.

It is, accordingly, a major object of this invention to provide improved thermometers which can be constructed less expensively and which will maintain their accuracy even though misused.

It is another object of this invention to provide an improved method of constructing a positioning surface on a thermometer tube.

A further object of this invention is to provide an accurately located positioning surface easily obtainable on thermometer tubes which co-operates with a complementarily shaped positioning surface on a scale plate to prevent movement of the tube in respect to the scale plate.

Still another object of the invention is to provide a thermometer tube having an annular flanged end construction accurately located with respect to the thermometer tube readings for correctly positioning the thermometer tube on the scale plate.

A further major object of the invention is to provide an attractive scale plate that can be easily formed to facilitate the insertion and extraction of a thermometer in and out of meat.

A still further object of this invention is to provide a scale plate having an extension that is shaped to be easily grasped between the forefinger and thumb.

Still another object of the invention is the provision of a novel frictional grip method of fastening the thermometer tube to the scale plate that permits ready adjustment of the tube position with respect to the scale markings in assembly, and in a meat thermometer brings the tube accurately to proper position with relation to the scale as a result of the pressure applied in inserting the tube end into the meat.

These and other objects of this invention will become more fully apparent as the description proceeds in connection with the accompanying drawings in which:

Figure 1 is a front view of the thermometer and scale plate;

Figure 2 is a side view of the thermometer of Figure 1;

Figure 3 is a partial view of the thermometer tube as it appears during one step of its construction;

Figure 4 is a diagrammatic view of the thermometer during another step in its construction;

Figure 5 is a sectional view taken along line 5—5 in Figure 1; and

Figure 6 is a rear view of the scale plate.

My invention is illustrated in its preferred form as a meat thermometer having as its principal components a thermometer tube 10, scale plate 12 and a pair of brackets or securing straps 14 and 16. Scale plate 12 is suitably calibrated and may include such other information as is pertinent for its use as a meat thermometer. Thermometer tube 10 which in the embodiment shown is cylindrical, is provided with projecting buttonhead 20 at its upper end having a substantially flat tube locating end surface 22. Bulb or reservoir end 24 of thermometer 10 may be pointed for easy insertion to meat and may, if desired, have a pointed metal tip 26.

Surface 22 is accurately located with respect to the height of the fluid column 30 at a predetermined calibrating temperature. The bulb end of the thermometer is inserted in a bath, the temperature of which is thermostatically controlled and the height of the fluid column indicated as by a small scratch 32 on thermometer tube 10 as illustrated in Figures 3 and 4. The thermometer is then placed in a second bath, the temperature of which is thermostatically controlled at a second temperature and a second mark 34 is made to indicate the height of fluid column 30 at this temperature. Any extra tubing length beyond that needed for forming head 20 is cut by any desired means from tube 10 and the cut end 44 of the thermometer is heated to seal the glass at the tip. Thermometer tube 10 may then be guided on member 45 while end 44 is still plastically deformable and forced or upset against plane surface 46 to compress heated tube tip 44 into its buttonhead or annular flange shape with the diameter of buttonhead 20 being slightly less than twice the diameter of tube 10 as clearly illustrated in Figure 4. Either or both of marks 32 and 34 are used to indicate the proper final position of the thermometer tube with respect to surface 46 to thereby assure that surface 22 of buttonhead or ridge 20 is accurately located with respect to scratches 32 and 34 of the thermometer tube. The thermometer tube is held in this position during the short time required for solidifying the glass at end 44.

Scale plate 12 may be of metal such as aluminum, or of wood or the like and is provided with an elongated slot or kerf 48 most clearly shown in Figure 6, having its main axis generally perpendicular to the axis of thermometer tube 10 and positioned at a predetermined location with respect to the scale calibrations. Slot 48 need not be an aperture, but may merely be a groove, particularly if a wooden scale plate is used.

Thermometer tube 10 is assembled into operative position on scale plate 12 with annular ridge 20 fitting in slot or kerf 48 and turned to have the enameled strip 49 of thermometer tube 10 positioned adjacent the scale plate.

Since the thickness of ridge or flange 20 may vary somewhat due to manufacturing tolerances, the height of slot 48 is made slightly larger than the thickness of head 20 to assure that no selective assembly is required and that all thermometer tubes can be used. The lower edge 50 of head 20 is not accurately located and is not intended to fit against the lower edge or surface of slot 48. A small amount of clearance between surface 50 and the lower surface of slot 48 is not objectionable because thermometer tube 10 is frictionally grasped by brackets 14 and 16 which under ordinary conditions prevent movement of the thermometer tube. When inserting thermometer 10 in meat by pushing on scale plate 12, surface 22 is forced toward the upper surface of slot 48 where it is intended to be positioned The area of contact between the upper surface of slot 48 and top surface 22 of the thermometer tube is radially displaced only slightly from the periphery of tube 10 as clearly illustrated in Figure 2.

Bracket 14, most clearly shown in Figure 5, is made of a metal such as steel having some resilience or yield to permit frictional gripping without breakage of the thermometer tubes, and for cylindrical tubes, has a section in the form of an inverted U having a substantially flat outer portion 70 and substantially straight leg portions 72 and 74 frictionally engaging the circular thermometer tube 10 at three spaced areas. A better grip is maintained on cylindrical thermometer tube 10 by use of the U-shaped section than with a circularly shaped bracket because it yieldingly engages the tube at several spaced areas and the contacting surfaces are biased against the tube due to the resilience of the corner sections. Thermometer tubes having cross-sectional areas other than circular may also be gripped by resilient straps or brackets at spaced areas around the periphery of the tube. In any form the length of leg portions 72 and 74 is slightly less than the diameter of tube 10 to press the thermometer tube against scale plate 10 to give a frictional contact along an additional area.

Bracket 14 has ears 76 and 78 on the end of each leg which are secured to plate 12 with rivets 80 and 82. The rivets are headed by a stitching machine which does not force the ears 76 and 78 against the surface of the scale plate, but allows a small spacing between the ears and the scale plate which prevents indentation of the scale plate and cracking or chipping of the enamel or porcelain finish commonly used to provide an attractive appearing scale plate. This small spacing may be provided by shoulders 84 and 86 on rivets 80 and 82 or the ears may be initially bent to be biased against the upper rivet heads. With either construction the resilience of fillets 88 and 90 and the shortened length of legs 72 and 74 produce additional force which urges the thermometer tube also into frictional engagement with plate 12.

Bracket 16 is identical to bracket 14 and both of the brackets together hold the thermometer tube frictionally in fixed relationship with the scale plate 12 and normally prevent longitudinal movement of thermometer tube 10 with respect to the scale plate.

As a further feature of my invention scale plate 12 has surface 94 extending beyond the top of the calibrated portion which is curved to conveniently fit over the forefinger to provide a hand engaging portion to aid in the removal of the thermometer from meat and which can be grasped between the forefinger and the thumb during insertion of the thermometer into meat. The scale plate may be stamped from a thin metal sheet and tapered at both upper end 96 and lower end 98 to enhance the appearance. The upper end of the scale plate may easily be bent to form the hand engaging portion 94.

Slot 48 and annular flange 20 provide accurate initial positioning of thermometer tube 10 on scale plate during assembly and this feature of the invention is of general application in the thermometer art. However, in meat thermometers, slot 48 and flange 20 provide an additional function of preventing thermometer tube 10 from shifting with respect to the scale when the thermometer is inserted into meat. Because of the ruggedness of this construction and the shape of hand gripping portion 94 on scale plate 12, this thermometer can be conveniently and easily inserted into pieces of meat without disturbing the accuracy of the thermometer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a calibrated scale plate, a circular thermometer tube, bracket means straddling said tube for securing said tube on said scale plate, said bracket means comprising a pair of spaced generally U-shaped brackets of resilient material, each of said brackets having a pair of substantially straight legs and a substantially straight connecting cross member, the lengths of said legs each being no greater than the diameter of said tube, and means securing the free ends of the legs to the scale plate to cause the cross member and each leg to yieldingly engage the thermometer tube at space separated positions.

2. In combination: a scale plate calibrated over a given range and having a slot located at a predetermined distance from a calibrated mark in said range; a thermometer tube having a positioning structure terminating in a radially extending flange substantially symmetrical about the axis of the tube; said structure being located on an end of the tube at the same predetermined distance from the height of the fluid column in said thermometer tube at a temperature corresponding to said calibrated mark; bracket means straddling said tube for securing said thermometer tube on the scale plate with said flange protruding inside said slot; said bracket means comprising a pair of spaced resilient metal brackets; each of said brackets having a pair of substantially straight legs connected together at one end by a curved portion having a curvature different from the curvature of the front surface of the thermometer tube and having ears at the other end of each leg bent to lie generally in a plane parallel to the front surface of said scale plate; the length of the legs being slightly less than the distance between the end of the curved portion and the scale plate along the path taken by the legs; and means securing the ears to said scale plate with the ears biased toward but spaced a small distance from the scale plate thus forcing the legs to yieldingly engage the thermometer tube.

3. In combination: a thermometer tube; a calibrated scale plate; bracket means straddling said tube for securing said tube to the scale plate; said bracket means comprising a pair of longitudinally spaced resilient metal brackets; each of said brackets having a pair of substantially straight legs connected together at one end by a curved portion having a curvature differing from the curvature of the adjacent surface of the thermometer tube and having ears extending directly from the other end of each leg bent to lie generally in a plane parallel to the front surface of said scale plate; each of said legs having a length slightly less than the distance from said curved portion to the front surface of the scale plate along the path taken by the legs; and means securing the ears to said scale plate with the ears forced toward but spaced a small distance from said scale plate thus forcing the legs to yieldingly engage the thermometer tube.

4. A thermometer tube having a bulb end shaped for easy insertion into meat; a scale plate having a slot and being mounted to extend along a portion of said tube and to be spaced from said end to avoid interference with the meat; a positioning structure extending laterally beyond the periphery of said tube on the end opposite said bulb end; bracket means for securing said tube to said scale plate to hold said positioning structure in said slot comprising a pair of longitudinally spaced brackets; each of said brackets straddling the thermometer tube and having a pair of substantially straight legs of resilient material connected together at one end by an intermediate portion having a curvature different from the contour curvature of the immediately adjacent portion of the surface of the thermometer tube; each leg having at the other end an ear bent to lie generally in a plane parallel to the front surface of said scale plate; each of said legs having a length slightly less than the distance from the ends of said intermediate portion to the front surface of the scale plate along the path taken by said legs; and means securing the ears to said scale plate with the ears biased toward and spaced slightly from the scale plate to cause the thermometer tube to be yieldingly engaged by said brackets.

5. The method of mounting a thermometer tube on a scale plate having a graduated scale and a positioning surface substantialy perpendicular to the length of the graduated scale and at a predetermined distance from one graduation in said graduated scale comprising: marking the height of the fluid at a temperature corresponding to said one graduation before permanently sealing one end of said tube; heating said one end of the thermometer tube until it is plastically deformable; upsetting the heated end of the tube against a surface similar in conformation to said positioning surface and substantially perpendicular to the axis of said tube as a tube sealing operation to the extent necessary to form at the extremity of the heated tube end a complementary positioning surface at a distance from said marking equal to said predetermined distance; and mounting the thermometer tube on said scale plate with said positioning surfaces in cooperating relationship.

6. In the method of constructing a thermometer including a glass thermometer tube having a ridged end and a scale plate initially formed both with calibration markings and with a recess complementary to said ridge at a position determined before calibration of the thermometer tube, the improvement comprising the following steps: marking the height of the fluid column in the thermometer tube at a predetermined temperature before permanently sealing the tube; heating one end of the tube until plastically deformable; upsetting the heated end of the tube against a surface substantially perpendicular to the axis of the tube as a tube sealing operation to the extent necessary to form on one end of the tube said ridge extending radially about the periphery of the tube at a predetermined distance from said marking; and mounting said thermometer tube on the scale plate with said recess receiving part of said ridge and said thermometer tube aligned with said scale calibrations and with the tube mark aligned with the scale indicia corresponding to said predetermined temperature.

7. The method of constructing a thermometer tube as defined in claim 6 further including after marking the thermometer tube the step of removing excess thermometer tubing beyond a preselected distance from said mark thereby providing a controlled amount of tubing for use in forming said ridge.

8. The method of forming a thermometer tube comprising: first marking the thermometer tube at a position corresponding to the height of the fluid column in the thermometer tube at a predetermined temperature; then removing excess tubing beyond a first predetermined distance from said tube mark forming an open end portion on the tube; next heating said open end portion until said portion becomes plastically deformable; then moving the heated end portion of the thermometer tube in a direction parallel to the axis of the thermometer tube against a flat surface until said tube mark is a predetermined distance from said flat surface to form during the tube sealing operation a positioning surface at the extreme end of the tube having a single ridge-like portion extending in a radial direction about the periphery of the tube.

9. In combination: a thermometer tube; a thermometer tube backing plate; bracket means straddling said tube for securing said tube to the backing plate; said bracket means comprising a pair of longitudinally spaced resilient metal brackets; each of said brackets having a pair of substantially straight legs connected together at one end by a curved section having a curvature differing from the curvature of the adjacent surface of the thermometer tube and having ears extending directly from the other end of each leg bent to lie generally in a plane parallel to the front surface of the scale plate; each of said legs having a length substantially less than the distance from said curved portion to the front surface of said scale plate along the path taken by the legs; and means securing the ears to said scale plate with the ears forced toward but spaced a small distance from the scale plate thus forcing the legs to yieldingly engage the thermometer tube.

References Cited in the file of this patent
UNITED STATES PATENTS

| Number | Name | Date |
| --- | --- | --- |
| 338,279 | Linthicum | Mar. 23, 1886 |
| 1,896,503 | Addis | Feb. 7, 1933 |
| 1,995,250 | Hiergesell | Mar. 19, 1935 |
| 2,037,194 | Curtin | Apr. 14, 1936 |
| 2,042,982 | Chaney | June 2, 1936 |
| 2,119,126 | Bising | May 3, 1938 |
| 2,551,706 | Roth et al. | May 8, 1951 |
| 2,612,046 | Crawley | Sept. 30, 1952 |
| 2,662,407 | Hunt | Dec. 15, 1953 |